(12) United States Patent
Muraishi

(10) Patent No.: US 6,684,718 B2
(45) Date of Patent: Feb. 3, 2004

(54) LOAD DETECTION STRUCTURE FOR VEHICLE SEAT

(75) Inventor: Shouzou Muraishi, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 134 days.

(21) Appl. No.: 09/986,094

(22) Filed: Nov. 7, 2001

(65) Prior Publication Data

US 2003/0084731 A1 May 8, 2003

(51) Int. Cl.[7] .............................. G01L 1/10; G01L 1/04; G01L 1/22
(52) U.S. Cl. ............................. 73/862.474; 73/862.473; 73/862.627
(58) Field of Search ..................... 73/862.474, 862.473, 73/862.044, 862.045, 862.338, 862.627; 177/136

(56) References Cited

U.S. PATENT DOCUMENTS 6,039,344 A * 3/2000 Mehney et al. ............... 73/781
6,288,649 B1 * 9/2001 Wolfe .......................... 340/667
6,345,543 B1 * 2/2002 Aoki ........................ 73/862.474
6,356,200 B1 * 3/2002 Hamada et al. ............. 177/144

FOREIGN PATENT DOCUMENTS

| JP | 11304579 | 10/1999 |
| JP | 11001153 | 4/2000 |

* cited by examiner

Primary Examiner—Edward Lefkowitz
Assistant Examiner—Lilybett Martir
(74) Attorney, Agent, or Firm—Browdy and Neimark, P.L.L.C.

(57) ABSTRACT

A load detection structure in a vehicle seat having a slide rail device provided therewith, which basically comprises a generally oblong block member having a rigid yet resiliently deformable property and a strain gauge attached tight thereon. The block member extends along a part of the slide rail device, such that the deflectable portion thereof is operatively connected with the vehicle seat, while the base portion thereof is fixedly connected with that part of the slide rail device. Hence, a load applied to the seat causes deflection of the deflectable portion of block member, in response to which, the strain gauge detects an amount of such deflection and determines a weight of occupant on the seat.

6 Claims, 2 Drawing Sheets

LOAD DETECTION STRUCTURE FOR VEHICLE SEAT

BACKGROUND OF INVENTION

1. Field of the Invention

The present invention relates to a structure allowing for detection of a load applied to a vehicle seat. In particular, the invention is directed to such load detection structure for use in a vehicle seat slidable via a slide device.

2. Description of Prior Art

Recent years have witnessed a tendency for various automatically controlled functions and mechanisms to be increasingly incorporated in vehicle or automobiles, including safety devices such as air bags for protecting passengers against a great impact automatically in response to a collision, as well as various kinds of seat position adjustment devices for automatically adjusting the positions of seat sensitive to driver's or passenger's physiques and seating conditions. With such automated control innovations, there have been also found technical improvements to a passenger detection system for detecting the presence and absence of a passenger or driver in a seat of vehicle in advance before actuating or stopping the associated mechanical elements to automatically control various functions and mechanisms built in the seat.

Normally, the passenger detection system employs various sensors (e.g. a pressure sensitive element) which detect the weight of a passenger on a seat and emit a signal to electronic control systems for automatic control of various mechanical elements related to the seat. Most of the sensors are of a simple structure which can only sense the presence and absence of passenger on a seat, but the recent high-tech control technology inevitably requires that the sensors should further detect whether the passenger is an adult or a child as with air bag control system for instance.

To meet the demand, there have been proposed sensor systems for numerically detecting the weight of passenger or a corresponding load applied to the seat, determining whether the passenger is adult or child, according to a numerical data obtained, and then controlling and adjusting the associated mechanical elements to optimal conditions suited for the adult or child (e.g. controlling air bag), as disclosed from the Japanese Laid-Open Patent Publications Nos. 11-001153 and 11-304579. Namely, the Japanese Laid-Open Patent Publication No. 11-001153 shows a combination of an impact sensor and four load sensors, wherein each of the four load sensors is interposed between a slide rail device on which the seat is mounted and a support leg member fixed on the floor of vehicle. It also suggests an H-shaped base plate on which wiring of the load sensors is collectively arranged for electrical connection with another one cable. According thereto, the weight of an occupant on the seat is detected by the four load sensors in a collision case, and a signal emitted therefrom is determined by a control unit as to the numerical amount of the occupant's weight, so that the air bag is adjusted in inflation according to the numerical data on the occupant's weight, thereby realizing a proper inflation of air back to protect the occupant optimally according to his or her physique. On the other hand, the Japanese Laid-Open Patent Publication. No. 11-304579 discloses plural link mechanisms each having an arm pivoted therein, the link mechanisms being arranged between a slide rail fixed to a seat and a support base fixed on the floor of vehicle. In this prior art, a load sensor is provided at the free end portion of each arm of the link mechanism, such that a load applied vertically to the seat is imparted through the pivoted arm as an amplified or reduced vertical motion to the load sensor which then detects the amount of such vertical motion and determine a total weight of the seat and occupant on the seat. This reference states that a signal corresponding to the total weight may be emitted from the load sensors to a control unit associated with air bag and seat adjustment device, for instance.

However, the Japanese Laid-Open Patent Publication No. 11-001153 has no description on the mechanical structure of load sensor itself, and has no specific teaching on how the load sensor structurally supports the seat and how it actions to detect the seat occupant's weight. This prior art is therefore neither realistic nor practical in assembling an optimal mechanical structure between the sensor and seat. The Japanese Laid-Open Patent Publication No. 11-304579 is found defective in that its link mechanism and pivoted arm are complicated in structure and further they occupy much of space heightwise between the seat and slide rail device, which results in the seat becoming large vertically in size and increasing its weight. Consequently, there remains a room of improvement in materializing a simplified and effective structure associated with this sort of load detection system.

SUMMARY OF THE INVENTION

In view of the above-stated drawbacks, it is therefore a primary purpose of the present invention to provide an improved load detection structure arranged at a slide rail device of a vehicle seat, which is greatly simplified in structure with reduced number of constituent element and effective in avoiding undesired increase in height of the seat.

In order to achieve such purpose, the load detection structure in accordance with the present invention includes a detection means for detecting a load applied from an occupant on vehicle seat, said detection means comprising:

- a block member of a generally oblong shape extending its elongated body in the longitudinal direction thereof, the block member having a rigid yet elastically deformable property and including: an upper side; a lower side; a deflectable portion; and a base portion opposite to that deflectable portion; and
- a strain gauge means fixedly attached on one of the upper and lower sides of block member;
- wherein the block member is provided at a part of the movable rail element and extends therealong, such that the base portion of the block member is fixedly connected with such part of the movable rail element, whereas the deflectable portion thereof is operatively connected with the vehicle seat, whereby the load applied from the occupant on the vehicle seat is imparted to the block member, causing deflection of the deflectable portion of block member, and in response thereto, the strain gauge means detects an amount of such deflection and outputs a data which is a basis for determining a precise amount of the load corresponding to the amount of the deflection.

Accordingly, the load detection means is materialized simply by the block member and strain gauge means. Namely, it suffices only to fix one end portion of the block member to a slide rail device and movably connect another end portion of the same with the seat. Thus, the structure is quite much simplified, with a reduced number of required parts, thereby eliminating the assembling steps, making assembly of seat more rapid, and attaining reduction of whole costs involved. The block member may be of a generally oblong shape having a longitudinally elongated body, and therefore it can be attached on and along the foregoing part of movable rail element associated with the slide rail means, thereby avoiding the increase of whole height of the vehicle seat.

In the present invention, preferably, a link means may be provided between the vehicle seat and the slide rail means, extending along the foregoing part of movable rail element, so as to operatively connect the deflectable portion of block member with the vehicle seat and also securely connect the base portion of block member with the that part of movable rail element. More preferably, the link means may include a first connecting pin and a second connecting pin, and the said part of movable rail element may have a securing pin, with such an arrangement that the deflectable portion of block member is movably connected, via the first connecting pin, with one end part of the link means, while the block member base portion is not only fixedly connected with another end part of the link means via the second connecting pin, but also fixedly connected with the movable rail element via the securing pin.

Other various features and advantages of the invention will become apparent from reading of the descriptions hereinafter, with reference to the annexed drawings.

DETAILED DESCRIPTION OF PREFERRED EMBODIMENT OF THE PRESENT INVENTION

Figure 1:
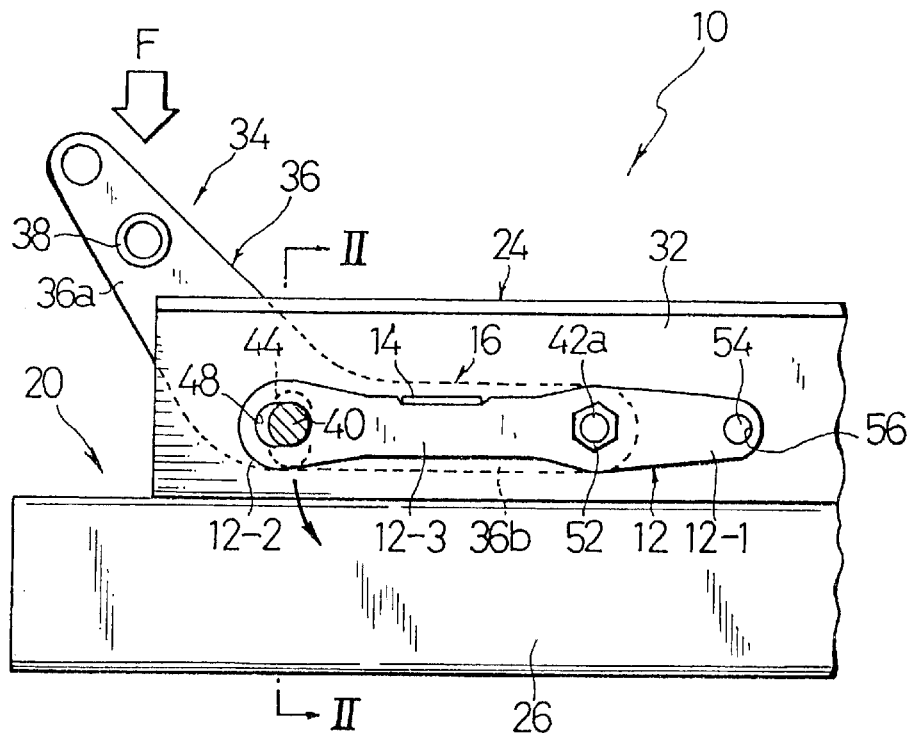
FIG. 1 is a partly broken schematic side view showing a principal part of a load detection structure in accordance with the present invention, which is applied to a slide rail device.

Referring to FIGS. 1 through 4, there is illustrated one preferred mode of load detection structure applicable to a slidable vehicle seat in accordance with the present invention. Reference is first made to FIG. 1 in which designation (10) generally represents a load detection structure provided on a slide rail device (20). As will be elaborated, the load detection structure (10) is basically formed by a load detection means (16) comprising a rigid yet elastic block member (12) and a strain gauge (14) in combination.

Figure 2:
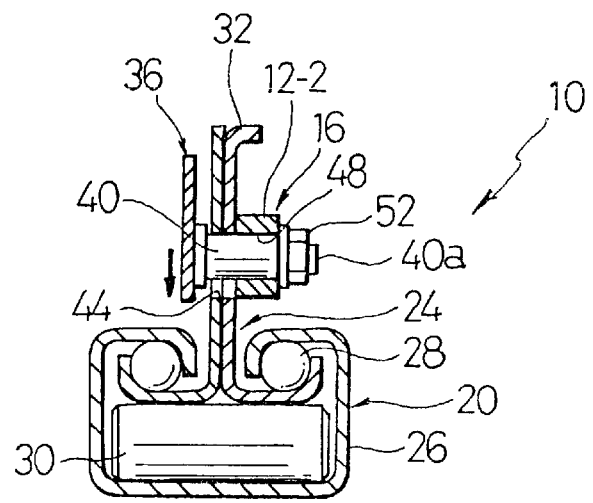
FIG. 2 is a sectional view taken along the line II—II in the FIG. 1.
Figure 4:
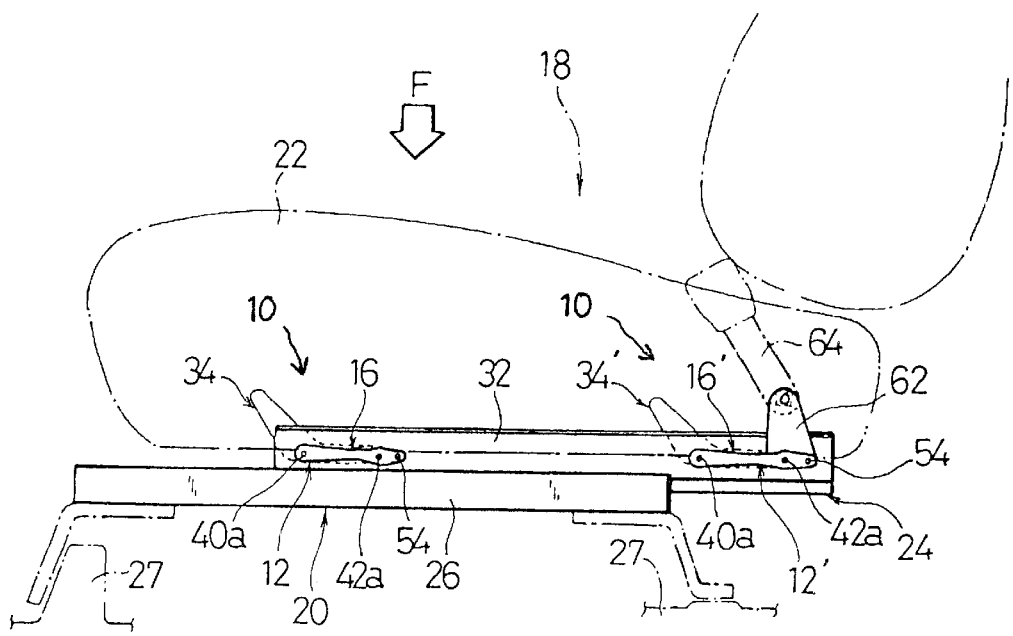
FIG. 4 is a schematic side view showing the state where the load detection structure of the present invention is incorporated in a vehicle seat.

As is known, the slide rail device (20) comprises a stationary lower rail (26) to be fixed on a floor side (27) and a movable upper rail (24) slidably fitted in and along the lower rail (26). The typical known configuration of such slide rail device (20) is shown in FIG. 2, wherein the movable upper rail (24) has an upward extension (32) erecting vertically therefrom and a generally inverted-T-shaped base portion slidably accommodated within the lower rail (26) via steel balls (28) and rollers (30). As can be seen in FIG. 4, the upward extension (32) of upper rail (24) is adapted for fixation to a seat cushion (22) of a vehicle seat (18). Also, operatively arranged at that upper rail upward extension (32) are two load detection means (16) (16') such that they are each disposed at forward and rearward end areas of the upward extension (32), respectively, as in FIG. 4, the details of which will be described later. Though not shown clearly, in fact, the slide rail device (20) is provided in pair; namely, a pair of slide rail devices (20) are provided under the bottom of seat cushion (22) via the load detection means (16), and therefore it is to be understood that in the illustrated embodiment, one pair of load detection means (16) are arranged at the respective forward areas of two slide rail devices (20) and another pair of load detection means (16') are arranged at the respective rearward areas of two slide rail devices (20). For the sake of simplicity, a description will be made only of one slide rail device (20) and one load detection means (16) arranged thereon as in the figures.

According to the illustrated mode of the present invention, the load detection means (16) is disposed on and along the lateral planar wall of the upper rail upward extension (32), and basically embodied by the combination of an oblong block member (12) and a strain gauge (14).

Figure 3:
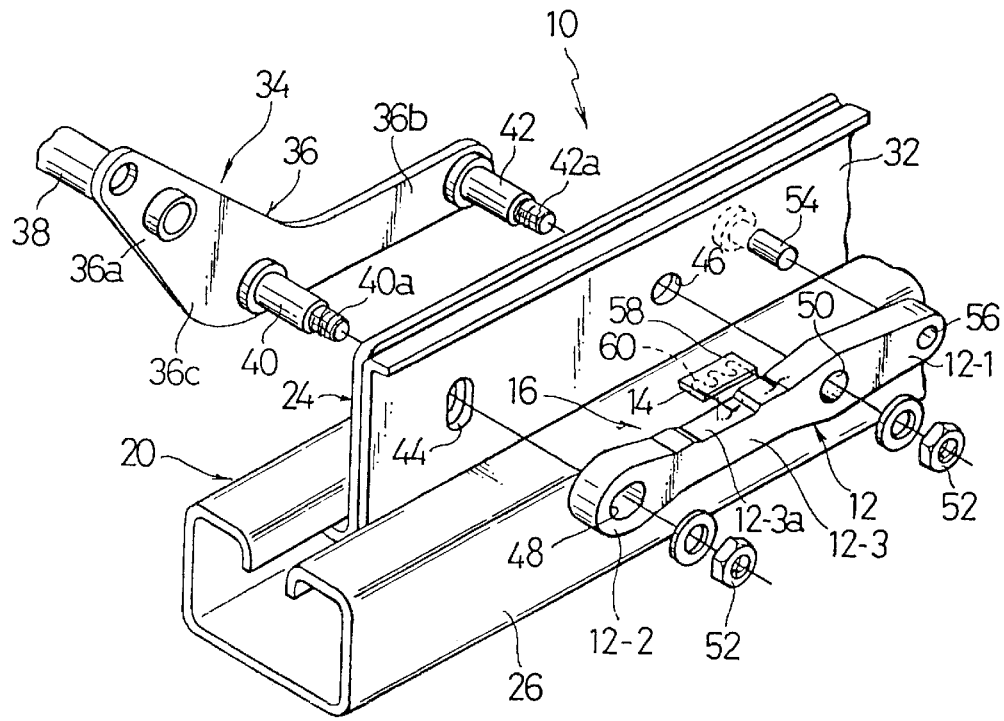
FIG. 3 is a partly broken, exploded schematic perspective of the principal part of the load detection structure which is the same as the one shown in FIG. 1.

The block member (12), a main part of the load detection means (16), is generally of an oblong configuration that extends its elongated body in the longitudinal direction thereof and formed from a rigid yet resiliently deformable material having a property that tends to recover into its original shape even when subjected to deformation by a great external load applied thereto. Preferably, the block member (12) may be formed from a spring steel material. As best shown in FIGS. 1 and 3, the block member (12) is so formed to have, defined therein, a forward movable end portion (12-2), a rearward base portion (12-1) which is relatively larger in size than the forward movable end portion (12-2), and a narrow intermediate portion (12-3) formed relatively thin heightwise between those two portions (12-2) (12-1). Further, formed in the forward end portion (12-2) is a horizontally elongated hole (48), whereas, formed in the rearward base portion (12-1) are a pair of spaced-apart first and second securing holes (50) (56).

As will become apparent later, the narrow intermediate portion (12-3) is a point providing a vertical resilient bendability of the block member (12) relative to the rearward base portion (12-1). Also, the narrow intermediate portion (12-3) has an upper area (12-3a) on which is fixedly mounted the strain gauge (14) for detecting an amount of strain or deflection caused in the block member (12). In the shown embodiment, the strain gauge (14) is of a known type comprising an electrical insulating thin plate (58) and a metallic resistance wire (60) embedded sinuously in that thin plate (58). Of course, the thin plate (58) is elastic and resiliently deformalble. The strain gauge (14) is not imitative, but may be formed in any otherwise manner without using such resistance wire (60) insofar as it can detect the deflection of block member (12). Also, the strain gauge (14) may be fixed on the lower side of the narrow intermediate portion (12-3) opposite to the upper area (12-3a).

In FIG. 4, a pair of forward and rearward block members (12) (12') are shown to be located at the respective forward and rearward points in an outer lateral wall of the upward extension (32) of upper rail (24). Likewise, referring to FIGS. 3 and 4, a pair of forward and rearward link assemblies (34) (34') are respectively disposed at the forward and rearward points in an inward lateral wall of the upward extension (32) such as to be generally in alignment with the two respective block members (12) which lie at the outward lateral wall of upward extension (23). While not shown, of course, another pair of such link assemblies are arranged at another right-side slide rail device (i.e. one of the two slide rail devices (20)) in that manner. As understandable from FIG. 3, one forward link assembly (34) at the shown left-side slide rail device (20) is interlockingly connected via a connecting rod (38) with another forward link assembly (not shown) at the right-side rail device (not shown), whereas one rearward link assembly (34') at the left-side slide rail device (20) is likewise connected via a connecting rod same as such rod (38) with another rearward link assembly (not shown) at the right-side rail device (not shown). In the illustrated embodiment, each link assembly (34) includes: a generally L-shaped arm (36) having an upwardly inclined arm portion (36a), a horizontal arm portion (36b) and an intermediate arm portion (36c) defined between the upward and horizontal arm portions (36a) (36b); a first connecting pin (40) fixed on the intermediate arm portion (36c); and a second connecting pins (42) fixed on the end of the horizontal arm portion (36b). Both of those two pins (40) (42) project from one lateral wall of the arm (36) outwardly, facing to the slide rail device (20). As explanatorily indicated in FIG. 3, the first and second connecting pins (40) (42) pass respectively through a vertically elongated hole (44) and a bearing hole (46), both of which are formed in the upper rail upward extension (32). Further, those two connecting pins (40) (42) pass respectively, rotatably, through the horizontally elongated hole (48) and first securing hole (50), both of which are formed in the block member (12) as previously stated. On the other hand, a support pin (54), which is secured in the upward extension (32) and projects outwardly therefrom, is inserted through the second securing hole (56) of the block member (12). By threadedly engaging the threaded end portions (40a) (42a) of connecting pins (40) (42) with the respective two securing nuts (52) (52), the arm and block members (36) (12) are not only connected together via the two connecting pins (40) (42), but also disposed symmetrically relative to and on the opposite sides of the upper rail upward extension (32). In this respect, it is seen that the first connecting pin (40) is slidably inserted through the vertically elongated hole (44) while the second connecting pin (42) is rotatably supported in the bearing hole (46), which therefore allows the arm (34) to rotate freely in the vertical direction relative to the second connecting pin (42). Strictly stated, the vertically elongated hole (44) is slightly arcuate shape which extends along the circumference of a circle having its center at the center of the bearing hole (46) so as to make smooth such vertical rotation of the arm (34).

In this context, it can be understood, though not shown completely, that all four arms (36) or four link assemblies (34) are rotatably supported by their respective four second connecting pins (42) with respect to the upward extensions (32) of upper rails (24), while being interlockingly connected with one another via two connecting rods (38) (since one of the two connecting rods (38) is connected between a pair of forward link assemblies (34) and another of them is connected between a pair of rearward link assemblies (34') as understandable from the preceding description).

As can be seen from FIG. 4, all the link assemblies (34, 34') are firmly attached at their respective two arm portions (36a) thereof to the bottom side of seat cushion (22) of vehicle seat (18).

With the structure described above, it is seen that the block member (12) is supported at its base end portion (12-1) by the following two points: the second connecting pin (42) of arm (36) and the support pin (54) of upper rail upward extension (32), whereas on the other hand, the opposite end portion (12-2) of block member (12) is slidably connected via the horizontally elongated hole (48) with the first connecting pin (40) of arm (36). Also, by virtue of the vertically and horizontally elongated holes (44) (48), as understandable from FIGS. 1 and 2, the arm (34), when applied by a downward load (F), is rotated downwardly along the vertically elongated hole (44) relative to the second connecting pin (42), and simultaneously, such downward motion is smoothly transmitted to the end portion (12-2) of block member (12) which is thus moved downwardly. This downward movement of that end portion (12-2) is realized by virtue of the horizontally elongated hole (48) giving an escape to allow concurrent horizontal displacement of the first connecting pin (40) which is being caused by the downward rotation of arm (36) along a circle having its center at the second connecting pin (42). In other words, the horizontally elongated hole (48) allows concurrent downward deflection of the block member end portion (12-2) which is being caused by the downward rotation of the arm (36) since the arm (36) is connected with that particular block member end portion (12-2) via the pin (40). It is thus appreciated that both end portion (12-2) and intermediate portion (12-3) of block member (12) are resiliently deflectable in the vertical direction relative to the base end portion (12-1) fixed at the two points (i.e. at 42 and 54) on the upward extension (32), by the reason of the fact that the heightwise narrow width of the intermediate portion (12-3) makes the corresponding region of block member (12) more deflectable in the vertical direction than other heightwise thick region (i.e. the end base portion (12-1)). Of course, even when deflected vertically, the narrow intermediate portion (12-3) will tend to recover resiliently into the horizontally extending normal state shown in the figures.

Accordingly, when a load (F) or the weight of a driver or passenger is applied to the seat cushion (22), the arm (36) is lowered to a certain degree corresponding to the passenger's weight, which simultaneously causes downward deflection of the block member (12). With this deflection of block member (12), the strain gauge (14) attached tight thereon is simultaneously deflected in the same downward direction, thereby detecting an amount of deflection corresponding to the passenger's weight and emitting a certain electric signal therefrom via lead wires. The electric signal is a basis for determining whether an occupant on the seat (18) is an adult or a child. In this connection, while not shown, the strain gauge (14) is electrically connected with a control circuit associated with an air bag, for instance. In that case, the control circuit determines whether the seat occupant is an adult or a child according to the kind of signal inputted therein and causes a proper inflation of the air bag. According to the present embodiment thus described, it follows that a combination of block member (12) and strain gauge (14) is arranged at each of the four corner areas of the seat cushion (22), hence providing total four load detection means (16) in a diagonal relation with one another under the seat cushion (22). In ordinary, a total mount of data detected from the four strain gauges (14) is computed by a control circuit (not shown) to determine an amount of load or a weight of passenger applied to the seat (18), but this is not imitative. For example, it may be so arranged that the four load detection means (16) are divided in electrical design into a forward paired set situated forwardly of the seat cushion (22) and a rearward paired set situated rearwardly of the same (22) so as to detect an amount of load applied most largely to one of the forward and rearward paired sets of load detection means (16), thereby determining a seating posture of passenger on the seat (18).

In this connection, instead of the above-described mode, the movable end portion (12-2) of block member (12) may be directly connected with the seat cushion (22) in an operative way together with a suitable support means, rather than using the arm (34).

Designation (62) in FIG. 4 stands for an anchor bracket to which a seat belt buckle (64) is supportively anchored. Here, it is appreciated that the second connecting pin (42) and support pin (54), which form a part of the present invention, are directly utilized to couple the anchor bracket (62) (and also the seat belt buckle (64)) with the upper rail (24). This contributes to further improvement and simplification in connecting the anchor bracket with the slide rail device without any need for providing a separate connecting element.

Form the descriptions above, it is appreciated that the present invention has the following effects and advantages:

(i) The load detection means (16) is materialized simply by a block member (12) and a strain gauge (14) attached on the block member (12). Namely, it suffices only to fix one end portion of the block member (12) to a slide rail device (20) and movably connect another end portion of the same (12) with the seat (18), so that a load applied to the seat (18) is smoothly imparted to such another end portion of block member (12), causing deflection of the block member (12) per se. In response thereto, the strain gauge (14) immediately detects an amount of the deflection as an amount of the load being applied to the seat (18). Thus, the structure is quite much simplified, with a reduced number of required parts, thereby eliminating the assembling steps, making assembly of seat more rapid, and attaining reduction of whole costs involved.

(ii) The load detection means (16) is mainly comprised of a generally oblong block member (12 or 12') having a longitudinally elongated body which can be attached on and along the longitudinally extending and heightwise small lateral wall (e.g. the upward extension (32)) associated with the upper rail (24). As such, the arrangement of load detection means (16) effectively avoids increase of the whole height of seat (18) and thus does not adversely affect the design and construction of seat (18). Further, this contributes greatly to simplification of the structure and reduction of costs.

(iii) The block member (12 or 12') may be interlockingly connected with the seat (18) via the link assembly (34 or 34') and an upper part of slide rail device (20). Since the link assembly includes two connecting pins (40, 42), it is possible to use those pins for rotatable and supportive connection of the block member with the link assembly, thereby making simplified and rapid the connection of block member (12) with the seat (18). Moreover, one of the connecting pins (i.e. 42) and a support pin (54) are utilized as effective two securing points to stably, firmly support the base end portion (12-2) of block member (12). This also adds to the simplification of the structure and seat assembly.

Finally, it should be understood that the present invention is not limited to the illustrated embodiment, but any other modifications, replacements and additions may be structurally applied thereto without departing from the scopes of the appended claims. For example, in place of the upward extension (32) integral with the upper rail (24), any kind of separate base member or plate may be fixed to the upper rail (24) insofar as it provide at lest one area to which the block member (12) alone or the block member (12) and link assembly (36) in combination can be attached Further, the present invention may also be applied to any other protection device than air bag and various seat adjustment devices, as well as to various kinds of seats usable in a train, aircraft or vessel.

What is claimed is:

1. In combination with a vehicle seat having a slide rail means for allowing sliding movement of the vehicle seat in the fore-and-aft direction thereof, said slide rail means including a movable rail element workable to allow said sliding movement of the vehicle seat, a load detection structure arranged at said slide rail means, said load structure including:

(a) a detection means for detecting a load applied from an occupant on the vehicle seat, said detection means comprising:

a block member of a generally oblong shape extending its elongated body in the longitudinal direction thereof, said block member having a rigid yet elastically deformable property and including:

an upper side;
a lower side;
a deflectable portion;
a base portion opposite to said deflectable portion;
a horizontally elongated holes formed in the base portion thereof; and
a pair of securing holes formed in the base portion thereof, said block member being provided at a part of said movable rail element so as to extend therealong, and a strain gauge means fixedly attached on one of said upper and lower sides of said block member;

(b) a vertically elongated holes formed in said part of said movable rail element;

(c) a bearing hole formed in said of said movable rail element;

(d) a securing pin formed in said part of said movable rail element, projecting therefrom; and (e) a link means provided between said vehicle seat and said slide rail means, said link means including an arm having first and second connecting pins projected therefrom, wherein said first connecting pin passes movably through said vertically and horizontally elongated holes respectively associated with said movable rail element and said block member, while said second connecting pin and said securing pin are secured in said pair of securing holes of the block member, respectively, so as to retain the base portion of the block member unmoved with respect to said movable rail element;

where said load applied from the occupant on the vehicle seat is imparted to said block member, causing deflection of the deflectable portion of the block member relative to said base portion thereof, and, in response thereto, said strain gauge means detects an amount of said deflection and outputs a data which is a basis for determining a precise amount of said load corresponding to said amount of the deflection.

2. The load detection structure as defined in claim 1, wherein said link means and said block member extending alongside said part of the movable rail element in a symmetrical fashion relative thereto.

3. The load detection structure as defined in claim 1, wherein said block member is so formed to have a first end portion, a second end portion and a narrow intermediate portion defined between said first and second end portion, said narrow intermediate portion rendering the block member deflectable, and wherein said first end portion and narrow intermediate portion correspond to said deflectable portion while said second end portion corresponds to said base portion, whereby both first end portion and narrow intermediate portion are deflectable relative to said second end portion.

4. The load detection structure as defined in claim 1, wherein said block member is so formed to have a first end portion, a second end portion and a narrow intermediate portion defined between said first and second end portion, said narrow intermediate portion having an upper side and a lower side, wherein said first end portion and narrow intermediate portion correspond to said deflectable portion, whereas said second end portion corresponds to said base portion, and wherein said strain gauge means is fixedly attached on one of said upper and lower sides of said narrow intermediate portion.

5. The load detection structure according to claim 1, wherein said part of the movable rail element comprises an upward extension integrally extending therefrom in upward direction, said upward extension also extending in a longitudinal direction of the movable rail element.

6. The load detection structure according to claim 1, wherein an anchor bracket is provided, which allows a seat belt buckle to be anchored thereto, and wherein said anchor bracket is firmly connected, via said second connecting pin and securing pin, with said part of the movable rail element.

* * * * *